(12) United States Patent
Stoianovici et al.

(10) Patent No.: US 8,061,262 B2
(45) Date of Patent: Nov. 22, 2011

(54) PNEUMATIC STEPPER MOTOR

(75) Inventors: Dan Stoianovici, Baltimore, MD (US); Alexandru Patriciu, Baltimore, MD (US); Dumitru Mazilu, Lutherville, MD (US); Doru Petrisor, Towson, MD (US); Louis R. Kavoussi, Lutherville, MD (US)

(73) Assignee: The Johns Hopkins University, Baltimore, MD (US)

( * ) Notice: Subject to any disclaimer, the term of this patent is extended or adjusted under 35 U.S.C. 154(b) by 615 days.

(21) Appl. No.: 11/359,815

(22) Filed: Feb. 22, 2006

(65) Prior Publication Data
US 2007/0034046 A1 Feb. 15, 2007

Related U.S. Application Data

(60) Provisional application No. 60/706,789, filed on Aug. 9, 2005.

(51) Int. Cl.
*F16H 47/04* (2006.01)
(52) U.S. Cl. ............ 91/491; 475/162; 475/75; 475/176; 475/178; 475/83
(58) Field of Classification Search .......... 475/162–166, 475/176–178, 75, 83; 74/640, 82, 411, 10.52, 74/22 A
See application file for complete search history.

(56) References Cited

U.S. PATENT DOCUMENTS

| | | | |
|---|---|---|---|
| 3,088,333 A | 5/1963 | Musser | 74/640 |
| 3,589,243 A * | 6/1971 | Bowman et al. | 91/481 |
| 4,243,355 A * | 1/1981 | Brudi et al. | 414/620 |
| 4,412,794 A * | 11/1983 | Presley | 418/61.1 |
| 5,060,539 A | 10/1991 | Cissell et al. | 74/640 |
| 5,643,128 A | 7/1997 | Kennedy | 475/168 |
| 6,016,715 A | 1/2000 | Hofmann | 74/110 |
| 6,155,220 A | 12/2000 | Marriott | 123/90.17 |
| 6,258,007 B1 | 7/2001 | Kristjansson | 477/7 |
| 6,314,835 B1 | 11/2001 | Lascelles et al. | 74/640 |
| 7,056,253 B2 * | 6/2006 | Tsurumi et al. | 475/162 |
| 7,771,418 B2 * | 8/2010 | Chopra et al. | 606/28 |

OTHER PUBLICATIONS

D. Stoianovici, "Multi-Imager Compatible Actuation Principles in Surgical Robotics," International Journal of Medical Robotics and Computer Assisted Surgery, vol. 1, pp. 86-100, 2005.

* cited by examiner

*Primary Examiner* — Charles Freay
*Assistant Examiner* — Christopher Bobish

(57) ABSTRACT

A stepper motor suitable for use in a medical imaging environment has (a) a cylindrical central gear having an external surface with circumferentially distributed and radially directed teeth, (b) a shaft for mounting the central gear such that it is constrained to move in rotational motion about its centerline, (c) a cylindrical hoop gear having a bore with an internal surface having circumferentially distributed and radially directed teeth, (d) level arm crank mechanisms for mounting the hoop gear such that it is constrained to move in translational-circular motion about the central gear's centerline, wherein this central gear is further configured to fit within the hoop gear's bore in such a manner that a plurality of the central gear and hoop gear teeth intermesh and cooperate so that the planetary movement of the hoop gear causes the central gear to rotate, and (e) piston mechanisms for applying a fluid pressure driven force to specified points on the hoop gear so as to cause its movement.

10 Claims, 12 Drawing Sheets

SECTION B-B (PRIOR ART)

FIG. 6

| Material | Component No. |
|---|---|
| Polyetherimide (Ultem 1000) | 34, 40 |
| Nylon 6/6 | 36 |
| Garolite G-11 | 20, 42 |
| Polyimide | 10 |
| Glass | 48 (bearings with Delrin rings) |
| White Silicone Rubber (50 Shore A) | 36 (on nylon fabric) |

PNEUMATIC STEPPER MOTOR

CROSS-REFERENCE TO RELATED APPLICATION

This application claims the benefit of U.S. Provisional Patent Application No. 60/706,789, filed Aug. 9, 2005 by Dan Stoianovici, Alexandru Patriciu, Dumitru Mazilu, Doru Petrisor, and Louis Kavoussi.

STATEMENT AS TO FEDERALLY SPONSORED RESEARCH

This invention was made with Government support under Grant No. NCI CA88232 and entitled "Multi-Imager Compatible Robot For Prostrate Access," which was awarded by the National Institute of Health. The Government may have certain rights in this invention.

BACKGROUND OF THE INVENTION

1. Field of the Invention

This invention relates to stepper motors that can provide directional translational or rotary motion in discrete displacements. More particularly, one embodiment of the present invention relates to a pneumatic stepper motor which is constructed from materials that can be used in all classes of medical imaging equipment.

2. Description of Prior Art

Noninvasive, diagnostic imaging techniques, such as ultrasound, x-ray and magnetic resonance imaging (MRI) are widely used in medicine. They are used to produce cross-sectional images of a patient's organs and other internal body structures.

MRI typically involves the patient lying inside a large, hollow cylinder containing a strong electromagnet, which generates a strong and uniform magnetic field that causes the electrons in a patient's body to spin in a uniform and predictable manner. The MRI equipment can then manipulate the spinning electrons and use the resulting information to generate an image of the inside of a patient's body.

However, difficulties are encountered in obtaining accurate images when disruptions and deflections in the magnetic field are experienced due to the presence in the field of materials that produce a magnetic field and/or are susceptible to producing their own magnetic fields when placed within an external magnetic field.

One source of magnetic field distortion can be equipment such as motors that are in the vicinity of the MRI machine. Motors are generally formed with materials that produce a magnetic field. Examples of such materials that are commonly used in motors include iron and brass. Thus, when placed in the field generated by the MRI machine, the typical electric actuated motor can cause artifacts in the image of the patient's body. Other forms of medical imaging (e.g., x-ray and ultrasound imagers) are also seen to have similar problems of distortions in their output images due to the presence of motors in the vicinity of the imaging equipment.

This situation has been a considerable implement to the development of medical robots that can operate within a medical imaging environment. This is significant because a robot that could precisely operate within the closed bore of high intensity magnetic resonance imaging (MRI) equipment could offer a means to yield significant improvements in various types of medical procedures. For example, such a robot would make possible the performance of remote procedures within the scanner under MRI guidance. This could allow one to insert a needle precisely at the center of a small tumor visualized in the image for performing a tumor-centered biopsy. Such biopsy procedures are typically performed with randomized sampling techniques. The use of a robot could reduce the incidence of false-negative sampling.

It is possible to build pneumatic, or non-electric, actuated motors from materials that do not produce a magnetic field. However, pneumatic actuation has previously been used primarily in industrial and commercial applications for its low cost, compact size, high power to weight ratio, reliability, and low maintenance. In many cases these characteristics make it preferable over electric actuation, especially when a supply of air is readily available.

The major limitation of pneumatic actuators, rotary or linear, has been their reduced precision in controlled motion. This is mainly caused by air compressibility and friction in the valve and actuator which make the pump-line-actuator dynamic system highly nonlinear.

Novel hardware and pneumatic-servo control solutions have been proposed to deal with these problems and impressive results have been achieved in force control and rotary speed regulation. Nevertheless, these complex solutions require special care so that most of their practical applications are still limited to unregulated pneumatic motion. A new approach to a pneumatic actuator is needed to circumvent these pneumatic-servo problems and to make possible the development of a medical robot for use in medical imaging environments.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide a stepper motor that can be used for medical applications which require the motor to be located in or in close proximity to medical imaging equipment.

It is another object of the present invention to provide a stepper motor that can be used in a surgical environment.

It is yet another object of the present invention to provide a motor that can provide precise, backlash-free motion.

It is still another object of the present invention to provide a motor that does not utilize electrical power or electrical components for its operation.

It is a further object of the present invention to provide a precise motor that can be powered by fluid power means.

These and other objects and advantages of the present invention will become readily apparent as the invention is better understood by reference to the accompanying summary, drawings and the detailed description that follows.

SUMMARY OF THE INVENTION

Recognizing the medical needs for the development of a precise rotary motor that can be used in medical imaging environments, the present invention is generally directed to satisfying the needs set forth above. In accordance with the present invention, the foregoing need can be satisfied by providing an especially designed stepper motor that is suitable for use in a medical imaging room.

In a first preferred embodiment, such a motor has: (a) a cylindrical central gear having two ends with a center line extending between these ends, and an external surface with circumferentially distributed and radially directed teeth, (b) a means for mounting the central gear such that it is constrained to move in rotational motion about its centerline, (c) a cylindrical hoop gear having a bore with an internal surface having circumferentially distributed and radially directed teeth, (d) a means for mounting the hoop gear such that it is constrained to move in translational-circular motion about the central gear's centerline, wherein this central gear is further configured to fit within the hoop gear's bore in such a manner that a plurality of the central gear and hoop gear teeth intermesh, and wherein these hoop gear teeth are further configured so as to cooperate with the central gear teeth so that the planetary movement of the hoop gear teeth causes the central gear to rotate, and (e) a means for applying a fluid pressure driven force to specified points on the hoop gear so as to cause its movement.

In a second preferred embodiment, the stepper motor described above has as its hoop gear mounting means a plurality of equal-lever arm cranks mechanisms, with each of these mechanisms having a centerline, and each of these being located such that they are equally spaced from the centerline of the central gear.

In a third preferred embodiment, the initially described stepper motor has as its means for applying a fluid pressure driven force to the hoop gear a plurality of diaphragm mechanisms, with each of these diaphragm mechanisms having a centerline, and each of these being located such that they are equally spaced from the central gear centerline.

In a fourth preferred embodiment, the initially described stepper motor further includes a means for controlling the distribution of fluid pressure to the means which applies force to the hoop gear.

In a further preferred embodiment, the present invention takes the form of a method for forming a stepper motor. The steps in this method consist of bringing together and appropriately utilizing the components described above for building a stepper motor.

Thus, there has been summarized above, rather broadly, the present invention in order that the detailed description that follows may be better understood and appreciated. There are, of course, additional features of the invention that will be described hereinafter and which will form the subject matter of the claims to this invention.

BRIEF DESCRIPTION OF THE DRAWINGS

FIG. 6 lists the MRI compatible materials that were used to construct a prototype of the embodiment shown in FIG. 5

DETAILED DESCRIPTION OF THE PREFERRED EMBODIMENT

Figure 1:
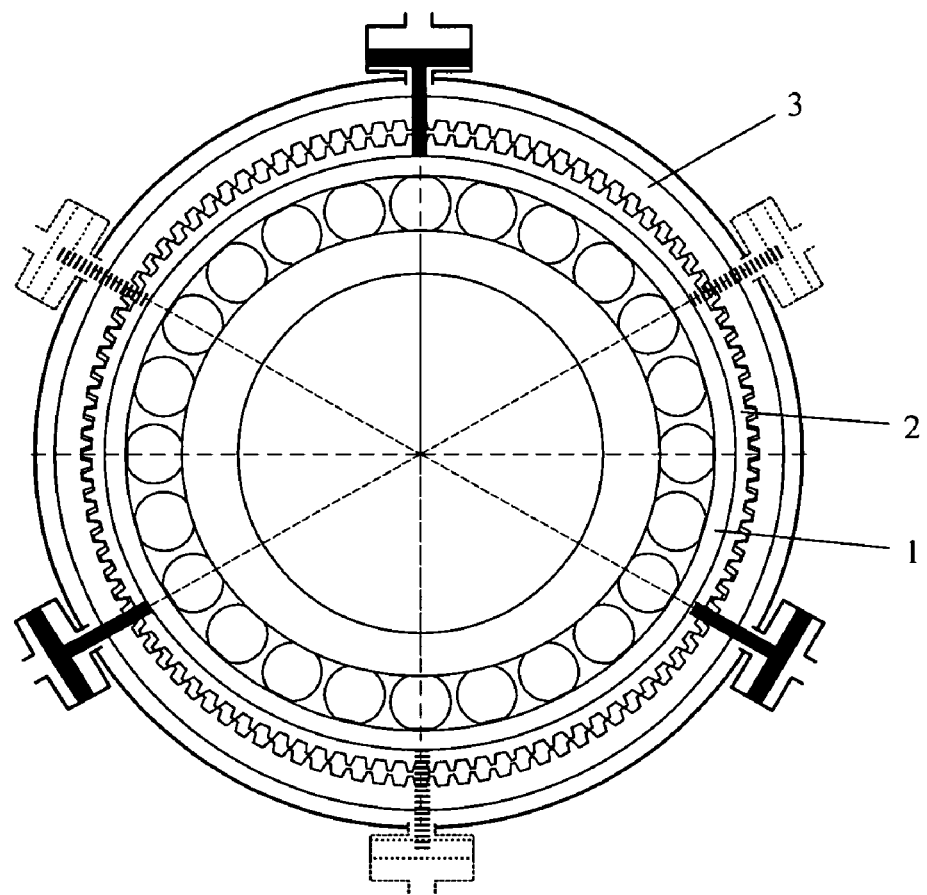
FIG. 1 is a cross sectional view of a pneumatic, harmonic motor.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Because the research associated with the development of the present invention has occurred over a period of four years, it proves useful to organize this disclosure so that it introduces the various embodiments of the present invention according to the chronological order in which they were developed by our research group.

The first of these, which is only briefly described herein and more completely described in U.S. Patent Publication No. US2005/0124452, the "Pneumatic Harmonic Motor," uses a fluid powered wave generator 1, in place of the common mechanical wave generator, to deform a flexspline 2, having circumferentially distributed teeth, that is situated within and concentric with a rigid circular spline 3 which also has circumferentially distributed teeth, their number being different than the number of teeth in the flexspline, which are configured to cooperate with the teeth of the flexspline. The wave generator 1 forces the flexspline to take the shape of an ellipse SO that its teeth engage the circular spline's teeth at two opposite points on the circumference of the circular spline. Rotation of the major axis of the ellipse causes successive teeth engagement and generates the rotation of the circular spline. See FIG. 1.

Figure 2:
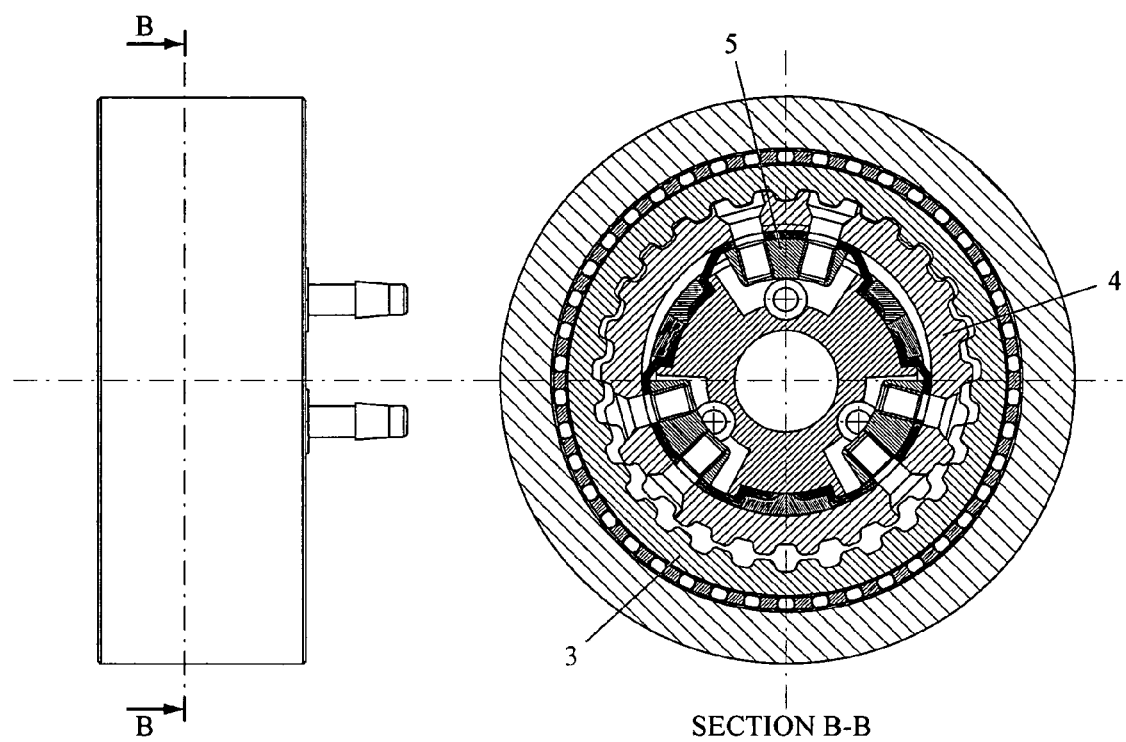
FIG. 2 is a cross sectional view of a pneumatic, planetary motor.

A second of these, which is also only briefly described herein and more completely described in U.S. Patent Publication No. US2005/0124452, the "Pneumatic Planetary Motor," also has a rigid circular spline 3 which has circumferentially distributed teeth. However, in place of a flexspline, the "Pneumatic Planetary Motor" has a rigid, circular planetary gear 4 with circumferentially distributed teeth which are configured to cooperate with the teeth of the spline 3. This motor also has a means 5 for applying a planetary motion to the planetary gear 4. See FIG. 2.

Figure 3:
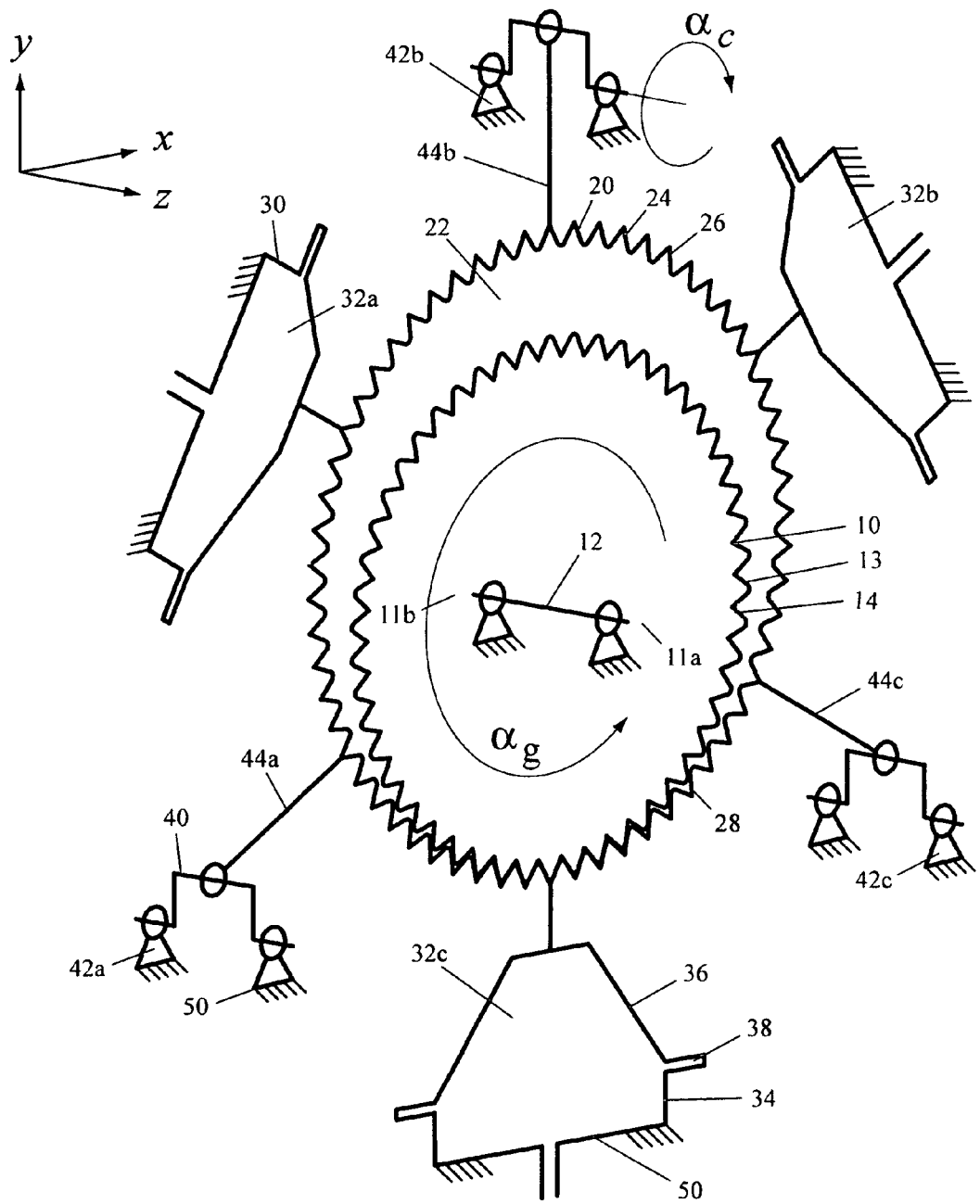
FIG. 3 presents an illustrative diagram of a conceptualized, preferred embodiment of the present invention and is used to show the relative motion between the various components of this embodiment.

The more recent versions of the present invention are best understood by initially presenting only a three-dimensional, illustrative diagram of their key components. Such a diagram betters allows the relative motion between these components to be understood. See FIG. 3 which attempts to schematically show a three dimensional (with X-Y-Z axes) isometric view of this embodiment's components whose motion is the X-Y plane is denoted.

The basic components of this pneumatic stepper motor embodiment are: (a) a cylindrical central gear 10 having two ends 11a, 11b with a centerline 12 extending between these ends, and an external surface 13 with circumferentially distributed and radially directed teeth 14, with this central gear configured to be mounted for the rotational movement of the gear about what FIG. 13 implies is its stationary centerline, (b) a cylindrical hoop gear 20 having a bore 22 with an internal surface 24 having circumferentially distributed and radially directed teeth 26, with this hoop gear configured to be mounted in such a manner that allows it to move in planetary motion about the centerline of the central gear. This central gear is further configured to fit within the hoop gear's bore 22 in such a manner that a plurality of the central gear and hoop gear teeth intermesh and cooperate so that the planetary movement of the hoop gear causes the central gear to rotate.

This embodiment also includes: (c) a fluid pressure applying means 30 for applying a planetary motion to the hoop gear so as to cause the central gear's desired rotation, and (d) a means for mounting 40 the hoop gear 20 so that it is constrained to move in planetary motion.

Figure 5C:
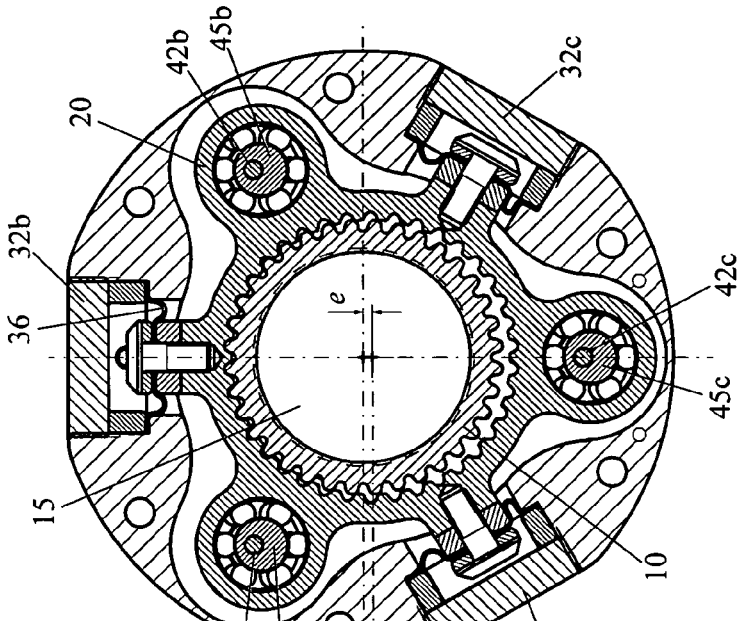
FIG. 5C is sectional view B-B of the pneumatic stepper motor shown in FIG. 5A.

The fluid pressure applying means 30 is seen to consist of three diaphragm cylinders 32a, 32b, 32c, alternatively, they could be pistons, which are grounded on a motor's body or base 50. These are circumferentially equally spaced about an axis which is the center line of the central gear 10. Each cylinder has a base 34 and a diaphragm 36 which is pressurized through a port 38. These diaphragms are connected at points on the perimeter 28 of the hoop gear and these connection points are initially radially equally spaced about the central gear's center line. As seen in FIG. 5C, these cylinders are configured to apply radially directed forces to the hoop gear.

The means for mounting 40 the hoop gear 20 gear includes three equal-crank parallelogram mechanisms 42a, 42b, 42c which are grounded on the motor's housing 50 and each have a lever arm of length "e". These are connected to the hoop gear with connections means 44, which, for the purpose of this illustration, take the form of connecting rods 44a, 44b, 44c. The crank mechanisms or cranks 42a, b, c are also radially placed about the same central axis, and equally spaced between the diaphragm cylinders 32a, b, c. The hoop gear is connected to the cranks 42a, b, c and form a triple-parallelogram (3P) mechanism. This support mechanism constrains the hoop gear 20 to a translational-circular (TC) or planetary trajectory. The hoop gear 20 does not spin, but it moves in planetary motions so that it translates on a circular path, any of its points describing a circle.

The hoop gear 20 is set in motion by the diaphragms 36a, b, c which under pressure successively force the hoop gear 20 away from the respective diaphragm cylinder 32. Directional rotation of the cranks is collected by successively pressurizing the diaphragms ($\alpha_c$). Because the hoop gear translates on a circle, its teeth come in and out of engagement with those of the central gear 10, causing it to spin in the opposite direction ($\alpha_g$) giving a rotary output to this motor. Thus, utilizing what I identify as a "new kinematic principle," the end-to-end motions of a piston within its cylinder are seen to generate a rotary, stepping motion by the present invention's utilization of an appropriately mounted, hoop gear that successively collects (while also demultiplying or gearing down) the small end-to-end motion of the piston strokes. Alternatively, by providing the central gear with a threaded bore, the rotation of this gear can be used to impart translational motion to a member having a threaded outer surface that is screwed into the central gear's threaded bore.

Functionally, this pneumatic stepper motor can be considered to consist of two components: a drive device motor and a gearhead. The drive device is represented by the diaphragm cylinders 32a, b, c, the cranks 42a, b, c, and the hoop gear 20. Rotary motion of the cranks 42a, b, c is generated by the diaphragms even in the absence of the central gear, so the hypothetical output of the motor itself is the motion of the cranks.

At the same time, the cranks 42a, b, c, the hoop gear 20, and the central gear 10 may separately act as a transmission. If rotary motion is applied to a crank, demultiplied rotation is collected on the central gear. With the motor, these components act as a gearhead.

This classification of components shows that the cranks 42a, b, c and the hoop gear 20 play a dual role in the design, both in the motor as well as the gearhead. For this, the mechanism functions as an assembly and its gearhead is not detachable, as for classic gearhead designs.

The dual role components are part of the triple-parallelogram (3P) mechanism. A single parallelogram mechanism (1P) also presents translational-circular (TC) motion, however, the 3P mechanism is used not only for symmetry, but to also eliminate singular positions typical with a 1P mechanism. These occur when the cranks 42 and connecting rod 44 are aligned. For a 3P mechanism, simultaneous alignment may never occur, making it singularity free. The payoff is that the 3P mechanism must be precisely constructed because it is overconstrained.

Step motion is achieved by sequentially pressurizing the diaphragms. Direction is given by the order of the sequence (i.e., −z rotation for the 32a-32b-32c sequence and +z rotation for 32a-32c-32b). The motor step size is 120° of crank rotation. The common half-step operation gives a twofold step size reduction and also improves motion performance. As for electric steppers, this measure significantly reduces the incidence of resonance problems that stepper motor-load dynamic systems are known to experience at some speeds.

Half-step is achieved by alternating single and dual phase operation in a 32a-32a32b-32b-32b32c-32c-32c32a sequence. The motor crank output has six steps/turn.

Figure 4:
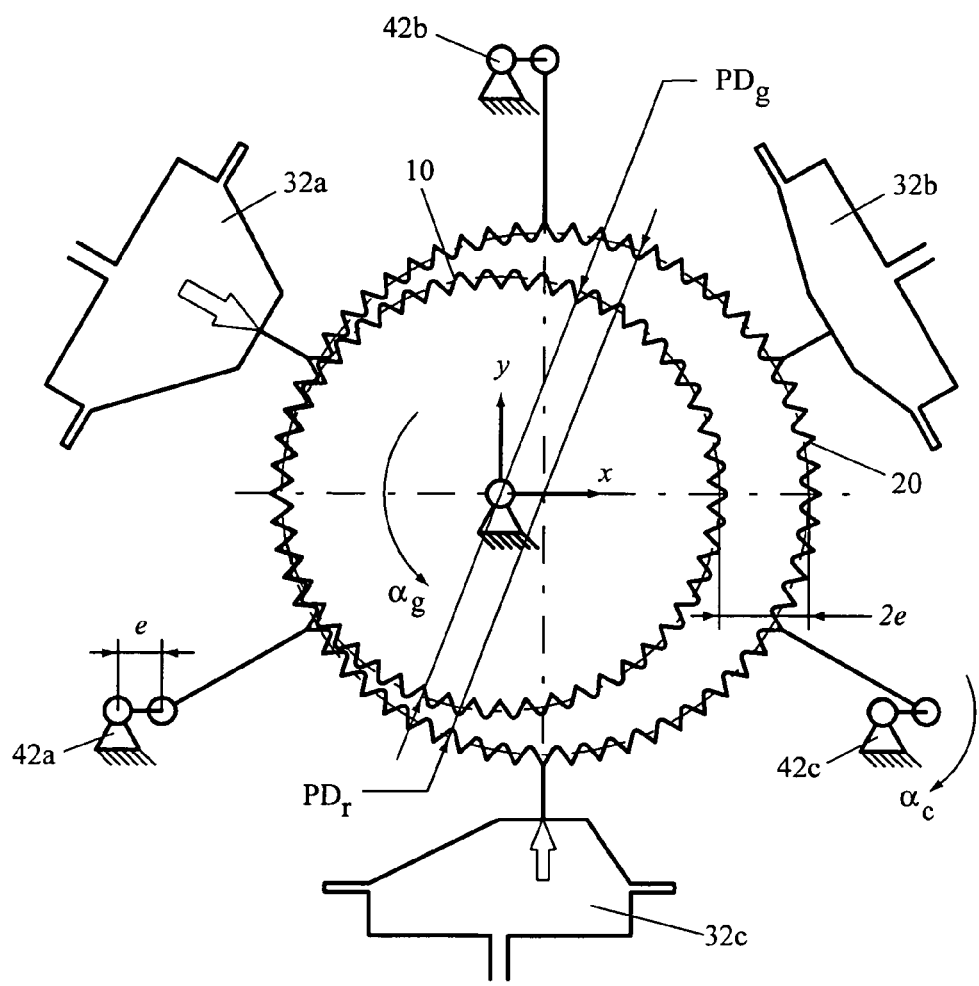
FIG. 4 illustrates the translational-circular nature of the motion experienced by of the hoop gear component of the preferred embodiment shown in FIG. 3

The radius of the translational-circular (TC) motion is given by the eccentricity (e) of the equal cranks. See FIG. 4. In this motion the radius of the hoop gear's circular motion is:

$$PD_h - PD_g = 2e$$

where, $PD_h$ and $PD_g$ are the pitch diameters of the hoop and central gear respectively.

The number of hoop ($Z_h$) and central gear ($Z_g$) teeth relate to the same gear module M:

$$M = \frac{PD_h}{Z_h} = \frac{PD_g}{Z_g}$$

The transmission ratio of the gearhead may be expressed as:

$$T = \frac{\alpha_c}{\alpha_g} = -\frac{Z_g}{Z_h - Z_g} \text{ with } Z_h > Z_g$$

This shows that the transmission ratio may equal $Z_g$. The gearhead reduces the size of the motor step T times.

Figure 5B:
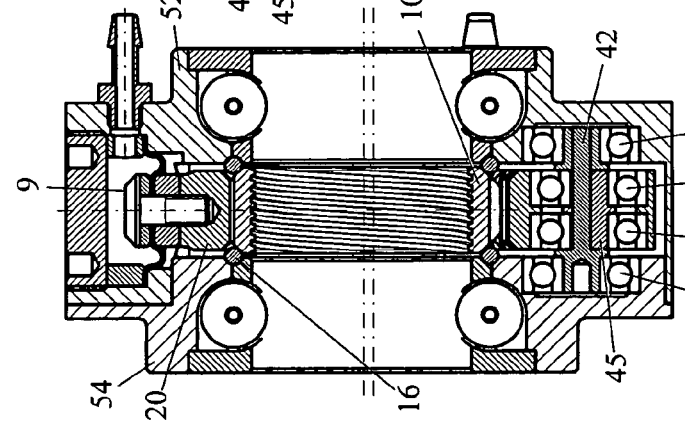
FIG. 5B is sectional view A-A of the pneumatic stepper motor shown in FIG. 5A.
Figure 5A:
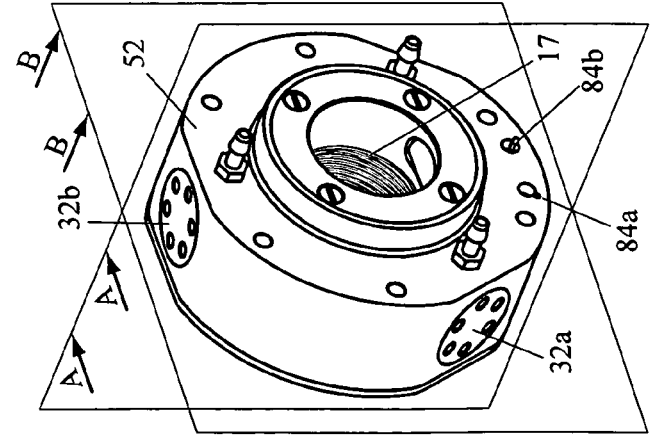
FIG. 5A is an isometric view of a preferred embodiment of the pneumatic stepper motor of the present invention.

A prototype of this embodiment is shown in FIGS. 5A-5C which display, respectively, isometric and cross-sectional views of this pneumatic stepper motor. This motor presents a cylindrically shaped motor housing 52 that is closed by a housing cap 54. The diaphragm cylinders 32a, b, c are built within the body. Each diaphragm 36 is fixed with a ring and cylinder cap threaded in the body 52.

The active side of the diaphragm 36 is attached to the hoop gear 20 with a screw between two washers. Note that washers are used to reduce the size of the hoop gear 20 allowing its assembly in the body 52.

The hoop gear 20 is supported by the three cranks 42a, 42b, 42c constructed in the form of three identical eccentric axels. Each axel includes a crank part 45 (cylindrical with eccentric hole), a shaft 46, bushing 47 and four bearings 48a, b, c, d.

The central gear 10 has a central bore 15 and the means for mounting this gear is seen to be bearings 16 which are mounted on both of its sides so as to hold the gear's centerline in a stationary position, as seen in FIG. 5B, and constrain it to move in pure rotation, which is essential if the central gear's motion is to be, like that of the hoop gear 20, singularity-free. For compactness, the rings of these bearings are built in the body and cap parts and use intercalated sapphire and PTFE balls (rolling cage design).

The bore of central gear presents an internal thread 17 to engage a screw part (not represented) if translational output of the motor is desired. Bushings, rollers, and pins are included for the same reason, to support and orient the screw shaft (presenting opposite flat faces for orientation, four faces preferable if possible). With rotary output, the central bore 15 is convenient for driving pass-through load shafts.

An important observation in the kinematics of the motor is that the motion of the diaphragms 36 is not linear. Diaphragms are attached to the hoop gear 20, which exhibits translational-circular (TC) motion. As such, the central part of the diaphragm describes circular motion. This unusual trajectory requires special design and manufacturing considerations in order to prevent premature wear and tear of the diaphragms and allow for sustained duty cycles.

The lateral displacement of the diaphragms 36 is directly related to the eccentricity of the cranks $e=M(Z_h-Z_g)/2$, which should be carefully coordinated with other design parameters. Secondly, the design should also allow for sufficient lateral clearance of the diaphragm 36 under its seat, so that it may freely act without stretching and wedging.

In the actual construction of this prototype, we used a custom made diaphragm 36 made of thin nylon fabric coated with silicone rubber vulcanized on its cylinder face. Keeping the outer side uncoated reduces friction with the lateral walls underneath. We also observed that the weaving direction of the diaphragm fabric has significant influence on its lateral flexibility and ultimately its lifespan. Fabric may easier be stretched in the diagonal direction of the weaving. For this reason, the fabric should be selected with higher diagonal flexibility and the diaphragm assembled so that its flexible direction is aligned in the direction of lateral displacement (B-B plane in FIG. 5). Diaphragm stiffness creates detent torque (torque required to spin the un-pressurized motor) which is undesirable. For MRI compatibility this prototype motor was constructed of the materials listed in FIG. 6.

A challenging problem of the motor design is to minimize the size of the step while eliminating interference between the teeth of the gears. Small steps require nearly equal (small $Z_h-Z_g$) gears with many teeth. This creates interference at the top of the teeth in the region where the teeth are coming out of engagement. This must be eliminated while maintaining smooth gear engagement.

An interesting observation is that in these conditions the gears are "sticky", meaning that they may not be pulled out of engagement in the radial direction. Section B-B of FIG. 5 shows that teeth detachment is restricted by the teeth on the sides of the engagement region. This fact has two implications. First, assembly should be performed axially. More interestingly, this shows that the motor could potentially be designed without the 3P crank mechanism, but the output will become compliant through the flexibility of the diaphragms. This was used in our earlier "Pneumatic Planetary Motor," see FIG. 2, which has no 3P and reversed in-out construction compared to the present stepper motor.

Control of the fluid power that is used to drive this stepper motor is provided by a pneumatic distributor 60 that generates the required pressure waves. Two types of such distributors have been used: mechanical and electrical.

Figure 7C:
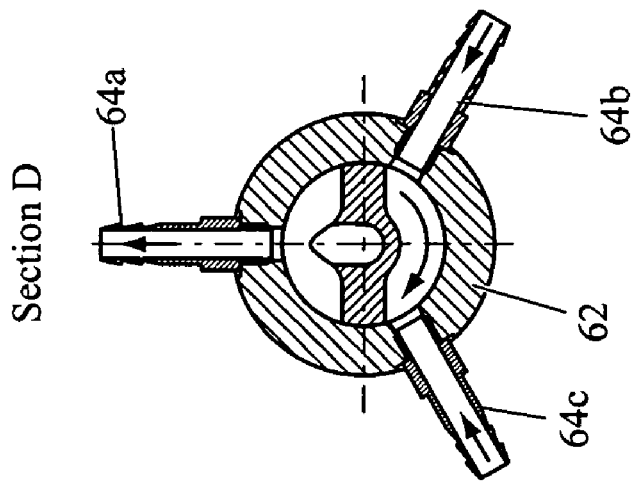
FIG. 7C is sectional view D-D of the pneumatic rotary distributor shown in FIG. 7A.
Figure 7B:
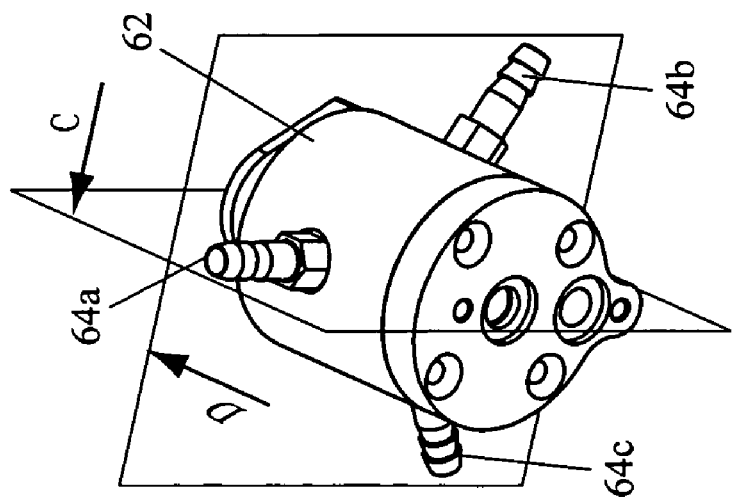
FIG. 7B is sectional view C-C of the pneumatic rotary distributor shown in FIG. 7A.
Figure 7A:
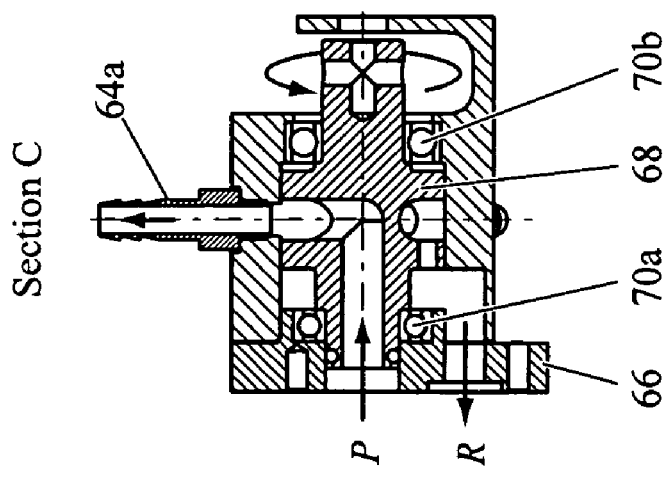
FIG. 7A is an isometric view of a preferred embodiment of a pneumatic rotary distributor that is suitable for supplying the pressure waves necessary to successively drive the diaphragms of the stepper motor shown in FIG. 5.

The design of the mechanical distributor is shown in FIGS. 7A-7C. A stator 62 presents three equally spaced radial openings communicating to the output ports 64a, 64b, 64c. The pressure P and return R are coupled through the stator cap 66. The rotor 68 is mounted on bearings 70a, 70b and connected to an electrical motor (not represented).

The rotor is constructed to generate six pressure cycles/turn. The design raises air leakage problems between the rotor 68 and stator 62. This may be addressed by using a seal or by precisely making the components so that the air gap is minimal. We constructed the later because it is frictionless, but manufacturing was difficult and small amounts of air were still lost. For this reason the electronic method presented next is preferable.

However, the rotary distributor is very intuitive to use and may be implemented for simple remote actuation in special cases. Remote actuation is achieved by simply connecting the ports of the motor and a distally located distributor 60 and supplying air pressure. This may even be used with manual input. An electricity free mechanism with 1:1 motion transfer ratio and torque amplification is implemented between the pump rotor and motor cranks.

An electronic pneumatic distributor was constructed using three electric valves mounted on a manifold. The valves are normally-closed, 3-Way, 2-Position direct-acting solenoid valves. These pressurize when activated and exhaust otherwise. A special electronic driver was designed to control the new motor with standard electric stepper-motor indexers and motion-control cards.

Figure 9:
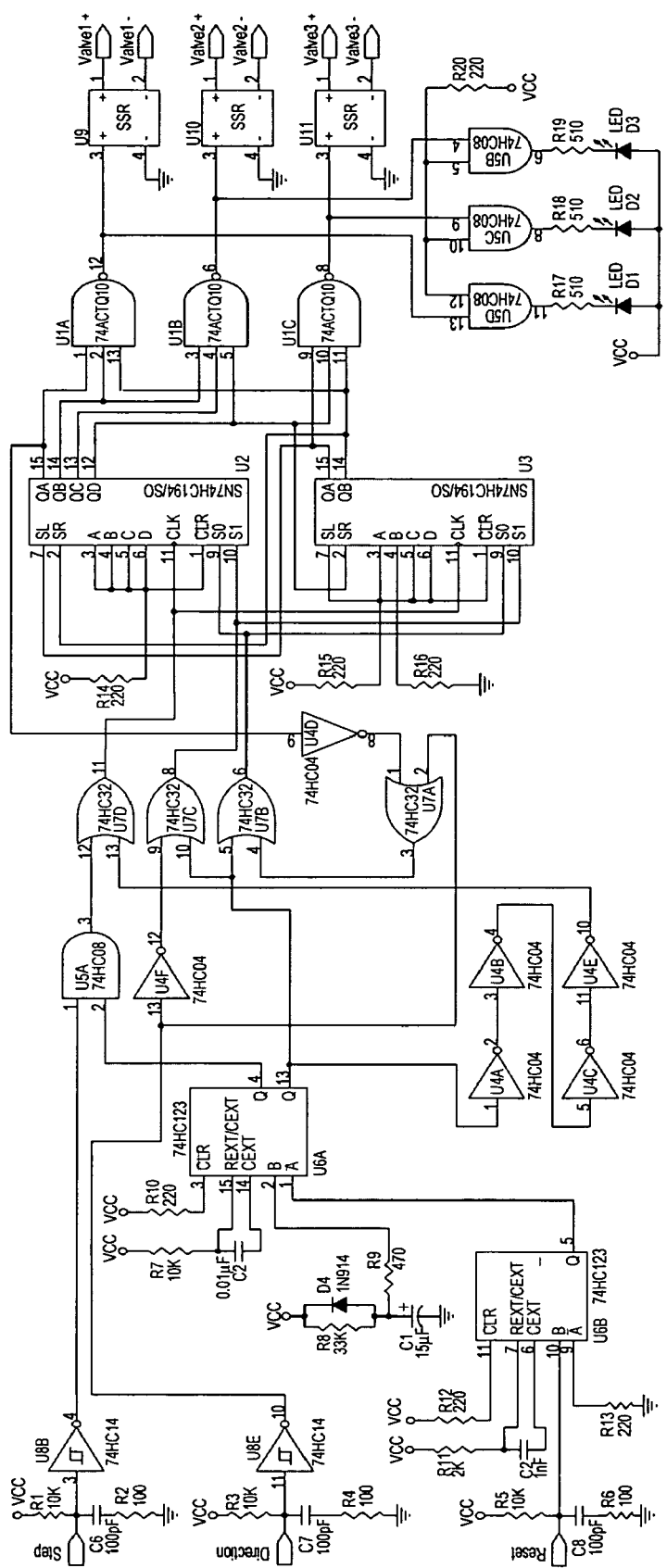
FIG. 9 shows an electrical circuit that is suitable for driving a pneumatic electronic distributor that is suitable for supplying the pressure waves necessary to successively drive the diaphragms of the stepper motor shown in FIG. 5.

The driver directionally cycles the activation of the valves in the desired 6-step sequence, as controlled by the step and direction signals of the indexer. The circuit in FIG. 9 implements a 6-bit rotating register U2-U3 (universal shift registers) clocked by the step signal in the direction of the input. Logic gates U1 are then used to transform this state to the desired 32a-32a32b-32b-32b32c-32c-32c32a sequence, which commands the solid-state relays U9-U11 of the valves. The preset and direction logic are implemented by the monostable U6, and the gates U4, U5A, U7. Trigger-Schmitt circuits (U8, U6 included) reduce noise sensitivity on the input signals.

Among three valves tested, we found the fast-acting valve NVKF334V-5D by SMC Corp. (Indianapolis, Ind.) to be best performing for our application, in terms of a well balanced response time/air flow capacity. This is a 24VDC, 4.3 W valve with 0.2Cv. The max cycling frequency is not rated, but the valve experimentally outperformed valves rated 50 cycles/sec, and is very reliable.

The max cycling frequency of the valves ($f_{max}$[Hz]) gives the first limitation of the motor speed. Independent of the commutation sequencing used (full or half-step), a valve is cycled once per crank turn. As such, the max stepping frequency ($v_{max}$) and max speed of the output gear ($\omega_g$) are:

$$v_{max} = 6 f_{max} [steps/s] \text{ or } [Hz] \text{ (for 6-steps/turn)}$$

$$\omega_g = 60 f_{max}/T [rpm]$$

In our prototypes, these max values are 300 [steps/sec], 166.6 [rpm] rotary output, and 16.6 [mm/s] linearly.

Nevertheless, the electronic distributor is preferable in most applications because it uses off-the-shelf components, is simpler, uses fewer moving components, does not leak, and outperforms the mechanical, rotary distributor. Electronic implementations also allows for dynamically changing the phase overlap of the commutation waves.

To monitor and control the motion of the motor, optical encoding was use. For compatibility with the MRI environment, we used fiber optic encoding so that all electric components are remotely located, keeping the motor electricity free. For simplicity, the existing hoop gear part of the motor is also used for encoding in place of a traditional encoder wheel. Two fiber optic circuits are set so that in its motion the hoop gear cyclically interrupts their beams generating quadrature encoded signals.

Figure 8A:
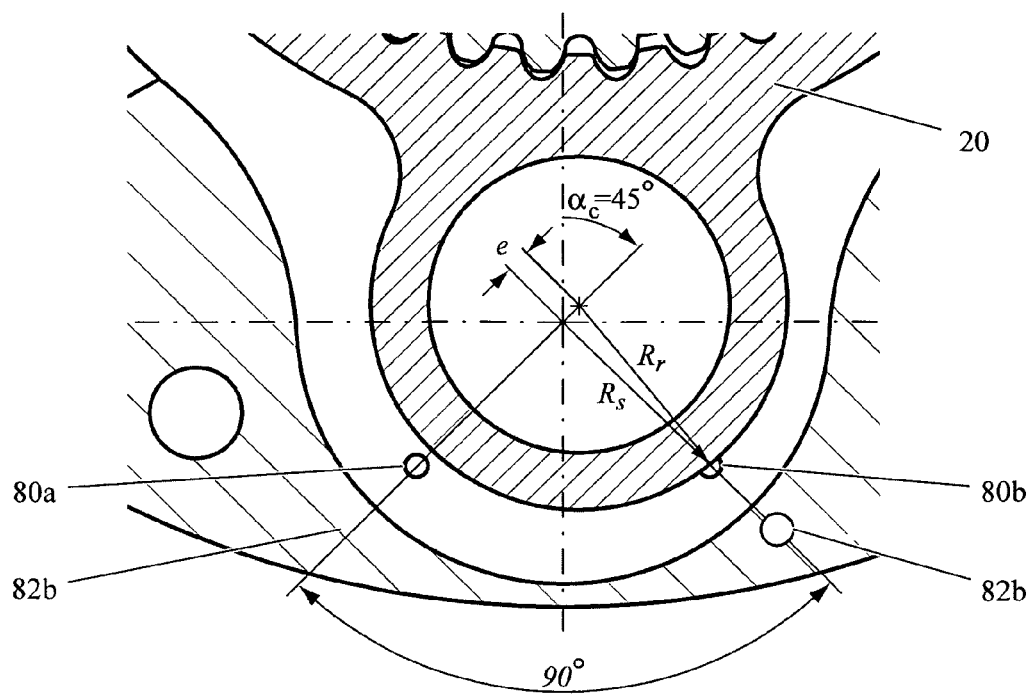
FIG. 8A shows a close up view of FIG. 5C so as to illustrate the elements of an optical encoding system that can be used to monitor or control the motion of the pneumatic stepper motor shown in FIG. 5.
Figure 8B:
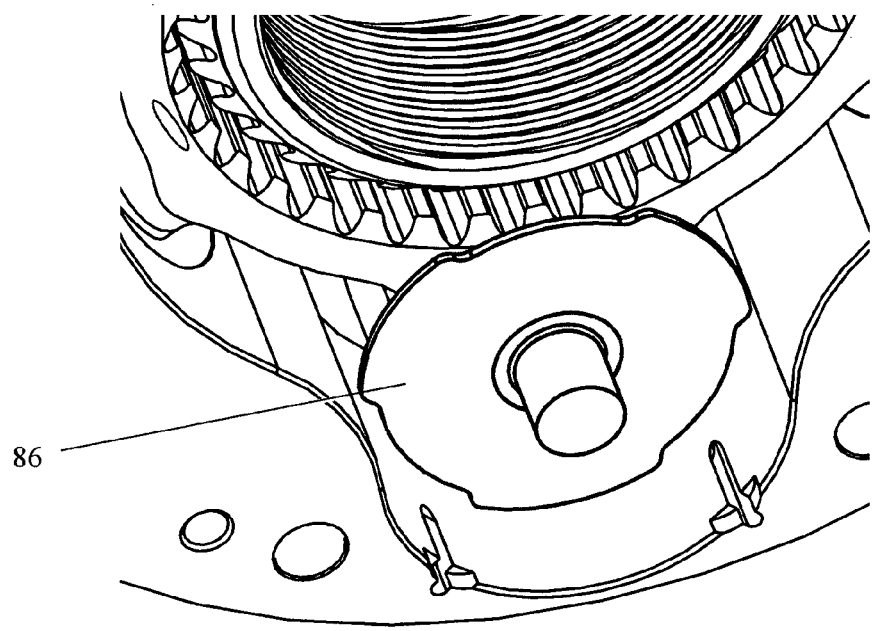
FIG. 8B shows a six count encoding wheel that could be used as part of an optical encoding system.

FIG. 8 shows a close up view of Section B-B in FIG. 5. In this view the cranks have been rotated ($\alpha_c$=45°) so that the fiber ends 80a, 80b become visible. These ends are matched with coaxially aligned fiber ends on the opposite side of the hoop gear (fixed in the cap part 54). The fibers on the side of the cap are coiled back (through holes 82a, 82b) so that the fiber optic connections 84a, 84b (see FIG. 5A) are located on the same side of the motor.

To obtain quadrature signals the fibers have been placed 90° apart at radius $R_s$ from the axis of the crank:

$$R_s = \sqrt{R_r^2 - e^2}$$

where, $R_r$ is the radius of the hoop gear part over the crank bearing.

A drawback of this constructive simplification is that the number of four encoder counts per revolution is lower than the number of crank half-steps (6), which reduces the effective step size of the motor in close-loop control. Alternatively, a six count encoding wheel 86, see FIG. 8B, could be mounted on a crank and used with similarly mounted fiber optics.

The ends of the fibers are connected to two D10 Expert fiber optic sensor by Banner Engineering Corp. (Minneapolis, Minn.), one for each fiber optic circuit. The digital output of these sensors is connected to the A and B encoder channels of a motion control card.

Testing of this prototype was conducted to measure its stepping accuracy and its load-handling characteristics. For these tests, the output shaft of the motor was connected to a dynamic torque measurement stand. The motor was connected to the distributor with ⅛ inch (3.175 mm) ID hoses. Experiments were performed with both distributors at various pressures and hose lengths.

Figure 10:
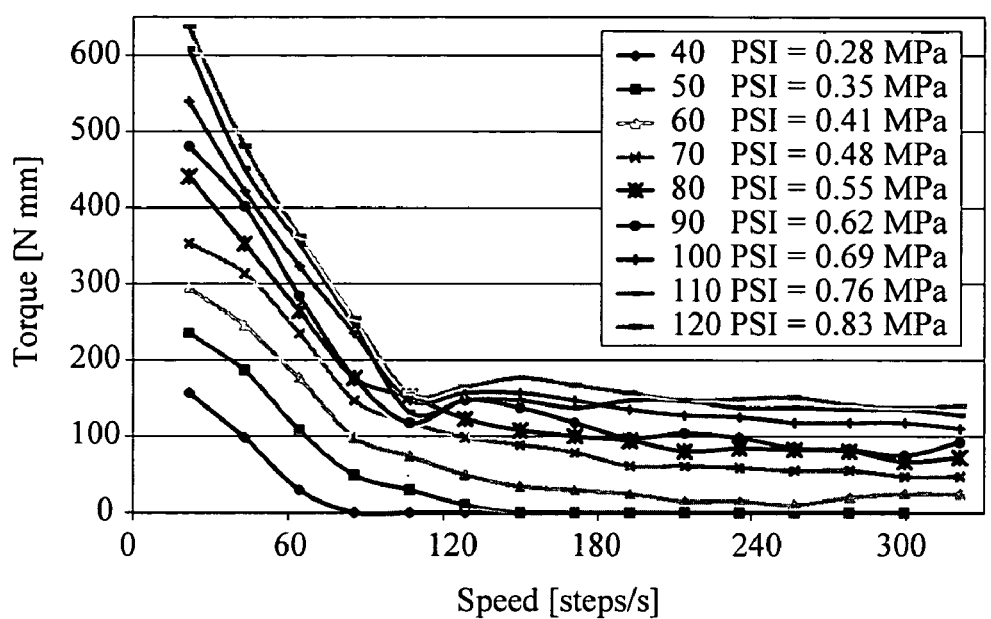
FIG. 10 shows motion test results for a prototype version of the pneumatic stepper motor shown in FIG. 5 and illustrates the impact of speed and operating pressures on the torque output of the motor.

The diagram in FIG. 10 depicts the output torque vs. speed graphs with the mechanical rotary distributor for various pressure levels when using 3 m long hoses. The graphs show a serious deterioration of the torque capability with speed. This phenomenon is explained by the dynamics and compressibility of the air being pulsed faster and faster through the lines, the hoses damping the pressure waves. This behavior is significantly influenced by the length of the hoses. Each pressure:hose-length:pump combination presents a characteristic speed above which the motor stalls, when the effective pressures acting on the diaphragms 36 fall below internal friction levels of the motor.

Figure 11A:
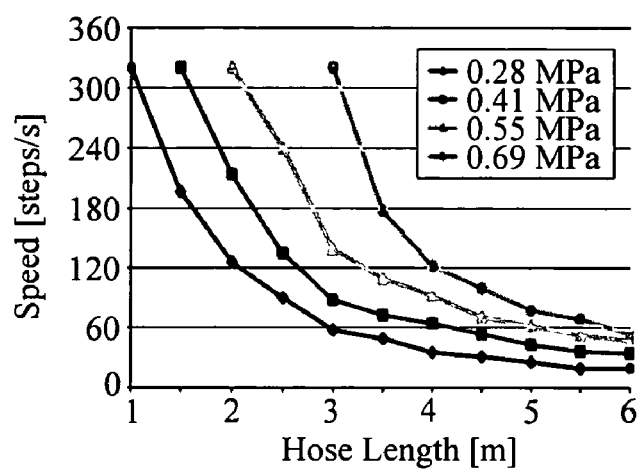
FIG. 11A shows motion test results for a prototype version of the pneumatic stepper motor shown in FIG. 5 and illustrate the fact that for a various operating pressures and a specific hose length that there is a characteristic speed above which this motor stalls.

FIG. 11A shows the dependency of the stall speed on the hose length with a rotary distributor. The power of the motor is also a function of these parameters, which measured up to 37 W.

Open-loop motion tests were performed to determine the motor's stepping accuracy. These show no drift and non-cumulative positioning errors, as for any stepper motors. The 99% confidence interval of the step error was ±0.84% of the angular step (3.333°).

Figure 11B:
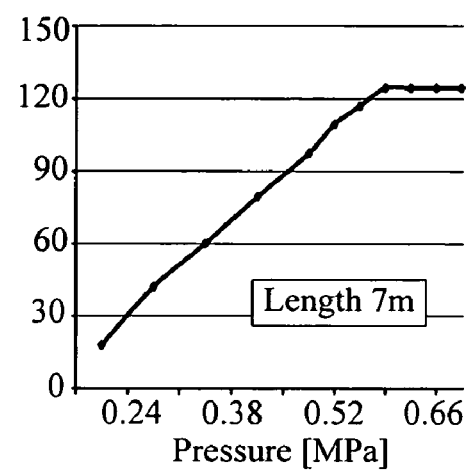
FIG. 11B shows motion test results for a prototype version of the pneumatic stepper motor shown in FIG. 5 and illustrate the dependency of the motor's stall speed on its hose length.

Experiments performed with the electronically controlled valve distributor show increased speed-torque performance. FIG. 11B shows the stall speed of the motor with 7 m hoses. The improvement may be explained by the faster opening time of the valves, which is independent of the stepping frequency allowing more time for the air wave propagation.

The speed-torque behavior of the stepper motor presented above requires particular care in implementing the control of the motor when closed-loop operation is desired. In this case, attention should be paid to limiting the speed command so that the motor torque can handle the payload. As with any stepper motor, when overloaded this motor stalls and skips steps. Even though motion is resumed when the torque drops, the lost steps may not be accounted for, unless an encoder is used. The built in optical encoder may either be used as a redundant encoder in open-loop control, or for providing closed-loop feedback. In either case, with this stepper motor increased torque is achieved by lowering speed. This behavior needs to be implemented in the controller.

Common stepper motion control cards use PID algorithms with various feed-forward terms and saturation functions to calculate stepping frequency and direction based on encoder feedback. These command higher stepping frequencies for the motor to catch-up with the desired motion. For this stepper motor this is inappropriate, because the increased frequency drops the torque. To overcome this problem we introduced a special saturation function of the command frequency, iteratively updated as:

$$s = \begin{cases} \max\ (s - k_{min}\bar{v}, s_{min}) \mid \bar{v} > \bar{v}_{max} \\ \min\ (s + k_{max}, s_{max}) \mid \bar{v} < \bar{v}_{min} \end{cases}$$

where, the saturation s is limited to the [$s_{min}, s_{max}$] interval set below the motor stall speed, coefficients $k_{min}$ and $k_{max}$ are experimentally set, [$\bar{v}_{min}, \bar{v}_{max}$] is an error transition interval, for which:

$$\bar{v} = |v_d - v_a|$$

where, $v_d$, $v_a$, and $\bar{v}$ are the desired, actual, and respectively error velocities in encoder space. A 1.5 (6/4) conversion factor is used between the encoder and motor steps (6/6 if codewheel is used). Normally, the saturation function keeps the command frequency below $s_{max}$.

When significant speed errors are detected ($\bar{v}>\bar{v}_{max}$), the saturation is progressively reduced to gain torque. When the situation has been overcome ($\bar{v}<\bar{v}_{min}$) the saturation is incrementally restored. The algorithm should be tuned to activate only when incidental torque overloading occurs. This saturation function is applicable to any chosen type of primary control to adapt its behavior to the particularity of the motor.

Figure 12:
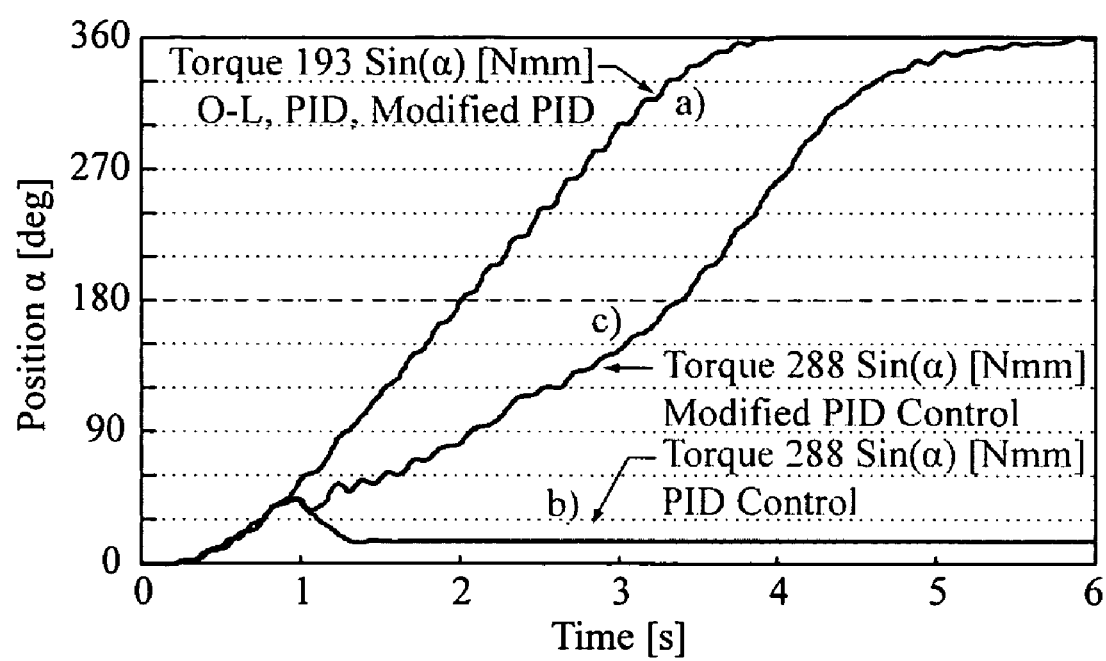
FIG. 12 shows motion test results for a prototype version of the pneumatic stepper motor shown in FIG. 5 and illustrates the speed-torque behavior (position of the shaft vs. time in five experiments) of this prototype.

Tests were performed connecting an eccentric weight to the motor shaft and measuring the rotation of the shaft ($\alpha$) with an additional encoder. The motor is to complete a full rotation with constant velocity (125°/s) starting and stopping to rest with constant acceleration (125°/s²) from the lowest position of the eccentric ($\alpha=0°$). The graph in FIG. 12 plots the position of the shaft vs. time in five experiments. For low torque values the open-loop, regular, and modified PID controls have identical performance (Graphs a). At higher torques the PID controller fails to complete the full rotation cycle (Graph b), but the modified PID control (Graph c) recovers from the impediment and completes the cycle by lowering speed and increasing the torque.

Step error tests were also performed with the modified PID control. As expected, these have similar results with the open-loop experiments. The 99% confidence interval of the step was 5°±0.028° with non-cumulative errors.

The compatibility of this prototype motor for use in an MRI robot was evaluated by utilizing six of such motors in a robot that was designed for performing transperineal percutaneous needle access of the prostate gland under direct MRI guidance. Its immediate application is for prostate brachytherapy.

This motor's performance matches the requirements of this clinical application for low speed (<20 mm/sec), high accuracy (<0.5 mm), and most importantly safety. The stepper motor of this invention is safer than servo-pneumatic actuation because in case of malfunction it may only stall (e.g., disconnecting a hose from this motor will not cause motion and potentially harm the patient).

Imager compatibility tests performed showed that this robot which used the six stepper motors of the present invention was unperceivable in MRI and that it did not interfere with the functionality of the imager, in motion or at rest. Motion tests showed the mean value of the robot's positioning error to be 0.076 mm with a standard deviation of 0.035 mm, which is highly adequate.

The stepper motor of the present invention was also tested in a 7 Tesla MRI scanner and no problems were encountered in its operation.

The mechanical performance of this stepper motor allows demonstrates that it may be used in actuating image-guided intervention robots and in other non-medical low-speed high-precision applications. Like any stepper motor, the drawback of the stepper motor of the present invention is its discrete positioning, but when operated with an integrated gearhead, the opportunity exists for trading speed in lieu of the step size. Switching to micro-step control (proportional pressurizing the diaphragms) could be employed for finer fixed point regulation, like with electrics. Within its limitations, the fully MRI compatible, stepper motor of the present invention can easily perform accurate and safe actuation, unlike other pneumatic motors.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention.

We claim:

1. A stepper motor comprising:
    a cylindrical central gear having two ends with a centerline extending between said ends, and an external surface with circumferentially distributed and radially directed teeth,
    a means for mounting said central gear such that said central gear is constrained to move in pure rotational motion about the centerline of said central gear,
    a cylindrical hoop gear having a centerline and a bore with a circular internal surface having circumferentially distributed and radially directed teeth,
    three equal-lever arm cranks mechanisms, each of said mechanisms having a centerline, and each of said crank mechanisms being connected at a point to said hoop gear such that said connection points are equally spaced from said hoop gear centerline and equally spaced around the perimeter of a circle about said hoop gear centerline, and each of said crank mechanisms being adapted for mounting said hoop gear such that said hoop gear is constrained to move in translational-circular, and singularity-free motion about the centerline of said central gear,
    wherein said central gear is configured to fit within the bore of said hoop gear in such a manner that a plurality of said central gear teeth and said hoop gear teeth directly intermesh at a contact point between said gears whose location travels around the entire circumference of said central gear when said hoop gear makes a full translational-circular revolution about said central gear centerline, and
    three fluid-pressure-driven drive members chosen from the group consisting of piston or diaphragm mechanisms, each of said members having a centerline and a direct contact point with said hoop gear and configured such that said drive member-hoop gear connection points are equally spaced from said central gear centerline and equally spaced around the perimeter of a circle centered on said central gear centerline and equally spaced and interspersed between the locations of said crank mechanisms centerlines and further configured so that each said drive member applies a radially directed force to said hoop gear so as to cause said translational-circular and singularity-free motion of said hoop gear.

2. The stepper motor as recited in claim 1, further including a means for controlling the distribution of fluid pressure to said three drive members.

3. A method for providing a stepper motor, said method comprising the steps of:
    utilizing a cylindrical central gear having two ends with a centerline extending between said ends, and an external surface with circumferentially distributed and radially directed teeth,
    utilizing a means for mounting said central gear such that said central gear is constrained to move in pure rotational motion about the centerline of said central gear,
    utilizing a cylindrical hoop gear having a centerline and a bore with a circular internal surface having circumferentially distributed and radially directed teeth,
    utilizing three equal-lever arm cranks mechanisms, each of said mechanisms having a centerline, and each of said crank mechanisms being connected at a point to said hoop gear such that said connection points are equally spaced from said hoop gear centerline and equally spaced around the perimeter of a circle about said hoop gear centerline, and each of said crank mechanisms being adapted for mounting said hoop gear such that said hoop gear is constrained to move in translational-circular, and singularity-free motion about the centerline of said central gear, wherein said central gear is configured to fit within the bore of said hoop gear in such a manner that a plurality of said central gear teeth and said hoop gear teeth directly intermesh at a contact point between said gears whose location travels around the entire circumference of said central gear when said hoop gear makes a full translational-circular revolution about said central gear centerline, and utilizing three fluid-pressure-driven drive members chosen from the group consisting of piston or diaphragm mechanisms, each of said members having a centerline and a direct contact point with said hoop gear and configured such that said drive member-hoop gear connection points are equally spaced from said central gear centerline and equally spaced around the perimeter of a circle centered on said central gear centerline and equally spaced and interspersed between the locations of said crank mechanisms centerlines and further configured so that each said drive member applies a radially directed force to said hoop gear so as to cause said translational-circular and singularity-free motion of said hoop gear.

4. The method as recited in claim 3, further including the step of utilizing a means for controlling the distribution of fluid pressure to said three drive members.

5. The stepper motor as recited in claim 1, further including a pneumatic commutation distributor for sequentially pressurizing said drive members to cause said translational-circular motion of said hoop gear.

6. The method as recited in claim 3, further including the step of utilizing a pneumatic commutation distributor for sequentially pressurizing said drive members to cause said translational-circular motion of said hoop gear.

7. The stepper motor as recited in claim 1, wherein when said fluid-pressure-driven drive members are diaphragm mechanisms, each of said mechanisms including a diaphragm having a center part that is connected to said hoop gear and configured to move in translational-circular motion while resisting the wearing and tearing of said diaphragm that is imposed by said translational-circular motion.

8. The method as recited in claim 3, wherein when said fluid-pressure-driven drive members are diaphragm mechanisms, each of said mechanisms including a diaphragm having a center part that is connected to said hoop gear and configured to move in translational-circular motion while resisting the wearing and tearing of said diaphragm that is imposed by said translational-circular motion.

9. The stepper motor as recited in claim 1, wherein said central and hoop gears, means for mounting said central gear, cranks mechanisms, and drive members are constructed from MRI compatible materials.

10. The method as recited in claim 3, wherein said central and hoop gears, means for mounting said central gear, cranks mechanisms, and drive members are constructed from MRI compatible materials.

* * * * *

UNITED STATES PATENT AND TRADEMARK OFFICE
CERTIFICATE OF CORRECTION

PATENT NO. : 8,061,262 B2
APPLICATION NO. : 11/359815
DATED : November 22, 2011
INVENTOR(S) : Dan Stoianovici et al.

It is certified that error appears in the above-identified patent and that said Letters Patent is hereby corrected as shown below:

In the Specification

Col. 1, Line 14-15 should read

STATEMENT AS TO FEDERALLY SPONSORED RESEARCH

This invention was made with United States Government support under Grant Number CA088232 awarded by the National Institutes of Health. The U.S. Government has certain rights in the invention.

Signed and Sealed this
Sixteenth Day of July, 2013

Teresa Stanek Rea
*Acting Director of the United States Patent and Trademark Office*